(12) United States Patent
Marti

(10) Patent No.: US 7,885,145 B2
(45) Date of Patent: Feb. 8, 2011

(54) SYSTEM AND METHOD FOR SELECTION OF AN OBJECT OF INTEREST DURING PHYSICAL BROWSING BY FINGER POINTING AND SNAPPING

(75) Inventor: Stefan Marti, San Francisco, CA (US)

(73) Assignee: Samsung Electronics Co. Ltd., Suwon (KR)

( * ) Notice: Subject to any disclaimer, the term of this patent is extended or adjusted under 35 U.S.C. 154(b) by 320 days.

(21) Appl. No.: 11/925,463

(22) Filed: Oct. 26, 2007

(65) Prior Publication Data

US 2009/0109795 A1   Apr. 30, 2009

(51) Int. Cl.
G01S 3/80 (2006.01)
(52) U.S. Cl. ....................................................... 367/118
(58) Field of Classification Search .......... 367/118–190
See application file for complete search history.

(56) References Cited

U.S. PATENT DOCUMENTS

| | | | |
|---|---|---|---|
| 5,311,203 A | 5/1994 | Norton | |
| 5,625,765 A | 4/1997 | Ellenby et al. | |
| 5,682,332 A | 10/1997 | Ellenby et al. | |
| 5,742,521 A | 4/1998 | Ellenby et al. | |
| 5,815,411 A | 9/1998 | Ellenby et al. | |
| 5,933,829 A | 8/1999 | Durst et al. | |
| 5,991,827 A | 11/1999 | Ellenby et al. | |
| 6,031,545 A | 2/2000 | Ellenby et al. | |
| 6,037,936 A | 3/2000 | Ellenby et al. | |
| 6,064,398 A | 5/2000 | Ellenby et al. | |
| 6,098,118 A | 8/2000 | Ellenby et al. | |
| 6,108,656 A | 8/2000 | Durst et al. | |
| 6,173,239 B1 | 1/2001 | Ellenby | |
| 6,265,676 B1 | 7/2001 | Zloter et al. | |
| 6,278,491 B1 | 8/2001 | Wang et al. | |
| 6,300,580 B1 | 10/2001 | Shenholz et al. | |
| 6,307,556 B1 | 10/2001 | Ellenby et al. | |
| 6,366,212 B1 | 4/2002 | Lemp | |
| 6,392,330 B1 | 5/2002 | Zloter et al. | |
| 6,396,475 B1 | 5/2002 | Ellenby et al. | |
| 6,414,696 B1 | 7/2002 | Ellenby et al. | |

(Continued)

OTHER PUBLICATIONS

Jim Swenson, Ask a Scientist: Snapping Fingers, Apr. 26, 2005.*

(Continued)

*Primary Examiner*—Thomas H Tarcza
*Assistant Examiner*—Luke D Ratcliffe
(74) *Attorney, Agent, or Firm*—Beyer Law Group LLP

(57) ABSTRACT

A system and method for selecting an object from a plurality of objects in a physical environment is disclosed. The method may include analyzing acoustic data received by a plurality of acoustic sensors, detecting a snapping sound in the acoustic data, determining the direction of the snapping sound, estimating the distance to an object based on loudness measurements of the snapping sound detected in the acoustic data, and determining the location of the object relative to the system based at least in part on the determined direction, the estimated distance to the object and the location of the system. The method may further include identifying the selected object based on its geolocation, collecting and merging data about the identified object from a plurality of data sources, and displaying the collected and merged data.

21 Claims, 15 Drawing Sheets

U.S. PATENT DOCUMENTS

| | | | |
|---|---|---|---|
| 6,434,561 | B1 | 8/2002 | Durst, Jr. et al. |
| 6,522,292 | B1 | 2/2003 | Ellenby et al. |
| 6,535,210 | B1 | 3/2003 | Ellenby et al. |
| 6,542,933 | B1 | 4/2003 | Durst, Jr. et al. |
| 6,570,506 | B2 | 5/2003 | Lemp, III |
| 6,690,370 | B2 | 2/2004 | Ellenby et al. |
| 6,771,006 | B2 | 8/2004 | Zioter et al. |
| 6,804,726 | B1 | 10/2004 | Ellenby et al. |
| 6,822,641 | B2 | 11/2004 | Shenholz et al. |
| 6,823,105 | B2 | 11/2004 | Zloter et al. |
| 6,841,742 | B2 | 1/2005 | Shenholz et al. |
| 6,865,608 | B2 | 3/2005 | Hunter |
| 6,876,356 | B2 | 4/2005 | Zloter et al. |
| 6,993,573 | B2 | 1/2006 | Hunter |
| 7,010,862 | B2 | 3/2006 | Lemp, III et al. |
| 7,031,875 | B2 | 4/2006 | Ellenby et al. |
| 7,068,180 | B2 | 6/2006 | Lemp, III |
| 2004/0027919 | A1* | 2/2004 | Erikson ............... 367/88 |
| 2004/0220807 | A9 | 11/2004 | Tamir et al. |
| 2005/0138200 | A1* | 6/2005 | Liu et al. ............ 709/238 |
| 2005/0150697 | A1 | 7/2005 | Altman et al. |
| 2005/0261990 | A1 | 11/2005 | Gocht et al. |
| 2006/0161339 | A1* | 7/2006 | Holmes et al. .......... 701/207 |
| 2006/0256660 | A1* | 11/2006 | Berger ................ 367/124 |

OTHER PUBLICATIONS

"Binaural for Beginners (FAQs)" http://binural.com/binfaq.html (Feb. 26, 2007).

"Digital Pen & USB Flash Drive." www.epos-ps.com/products.asp-?pid=1275&ppid=1278. (Feb. 26, 2007).

"Find Snipers." www.halfbakery.com/idea/Find_20Snipers (Feb. 26, 2007).

"Finger Snapping" http://www.newton.dep.anl.gov/askasci/gen01/gen01807.htm (Feb. 26, 2007).

"Wearable Gunshot Detector." www.militaryphotos.net/forums/archive/index.php/t-14738.html (Feb. 26, 2007).

http://www.shotspotter.com (Feb. 26, 2007).

Ashmead, D. and Wall, R. "Auditory Perception of Walls via Spectral Variations in the Ambient Sound Field." Journal of Rehabilitation & Development. vol. 36, No. 4 (Oct. 1999).

Berglund, E. and Sitte, J. "Sounds Source Localisation through Active Audition." IEEE/RSJ International Conference on Intelligent Robots and Systems. pp. 509-514 (2005).

Bian et al. "Using Sound Source Localization to Monitor and Infer Activities in the Home." GVU Technical Report ; GIT-GVU-04-20 (2004).

Blake, A. and Isard, M. "Active Contours." http://www.robots.ox.ac.uk/~contours/ (Feb. 26, 2007).

De La Hamette, P. et al. "Fingermouse: A Wearable Hand Tracking System." UBICOMP conference proceedings. http://www.wearable.ethz.ch/fileadmin/pdf_files/pub/ubicomp02-fingermouse.pdf (2002).

Hartley, R. and Zisserman, A. "Multiple View Geometry in Computer Vision (Second Edition)." Cambridge University Press (Mar. 2004).

Kish, D. "Echolocation: How Humans Can 'See' Without Sight." http://worldaccessfortheblind.org/echolocationreview.rtf (Feb. 26, 2007).

Mysliwiec, T. "Fingermouse: A Freehand Computer Pointing Interface." Proc. Of Int'l Conf. on Automatic Face and Gesture Recognition (1995).

Popper, A. and Fay, R. "Sound Source Localization." Springer Handbook of Auditory Research, vol. 25 (2005).

Scott, J. and Dragovic, B. "Audio Location:Accurate Low-Cost Location Sensing." Proceedings of Pervasive, Munich, Germany. LNCS 3468 (May 2005).

Srikanth, M. "Acoustic Source Localization by Triangulation using Cross Power Spectrum." http://ssl.sere.emet.in/~manohar/research9.htm (Feb. 26, 2007).

Staedter, T. "Digital 'Finger' Points, Feels and Paints." http://www.abc.net.au/science/news/stories/s1725593.htm (Feb. 26, 2007).

Starner, T. et al. "Real-time American Sign Language Recognition from Video Using Hidden Markov Models." IEEE Transactions on Pattern Analysis and Machine Intelligence vol. 20: 1371-1375 (1998).

Storring, M. et al. "Computer Vision-based Gesture Recognition for an Augmented Reality Interface." 4th IASTED International Conference on Visualization, Imaging, and Image Processing, pp. 776-771. (Sep. 2004).

Swindells, C. et al. "That one there! Pointing to Establish Device Identity." Symposium on User Interface Software and Technology: Proceedings of the 15th annual ACM symposium on user interface software and technology, pp. 151-160. (2002).

Thomas, B.H. and Piekarski, W. "Glove Based User Interaction Techniques for Augmented Reality in an Outdoor Environment." Virtual Reality: Research, Development and Applications. vol. 6: 2002 (1993).

* cited by examiner

MOVIE DIRECTOR FRAMING
GESTURE (RECTANGULAR, SQUARE)

SHAPING GESTURE
(TRIANGULAR)

*"OK" GESTURE
(CIRCULAR)*

*PICKING UP GESTURE
(FLAT RECTANGULAR)*

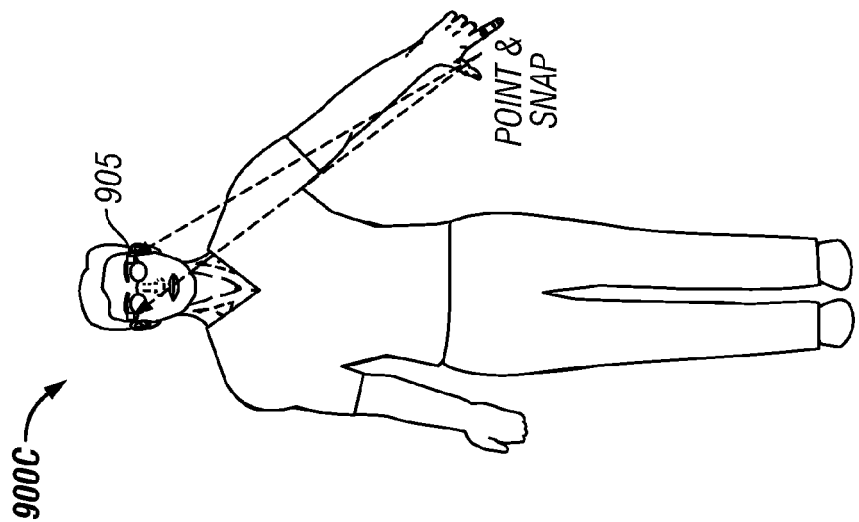
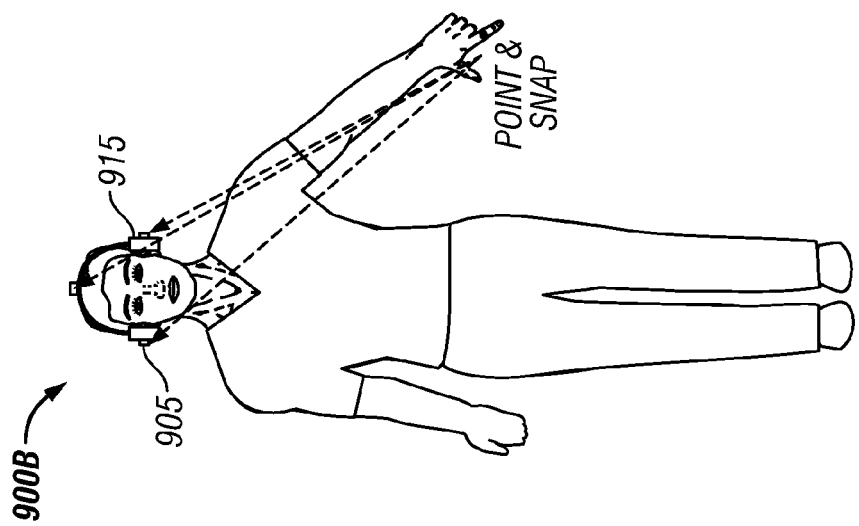
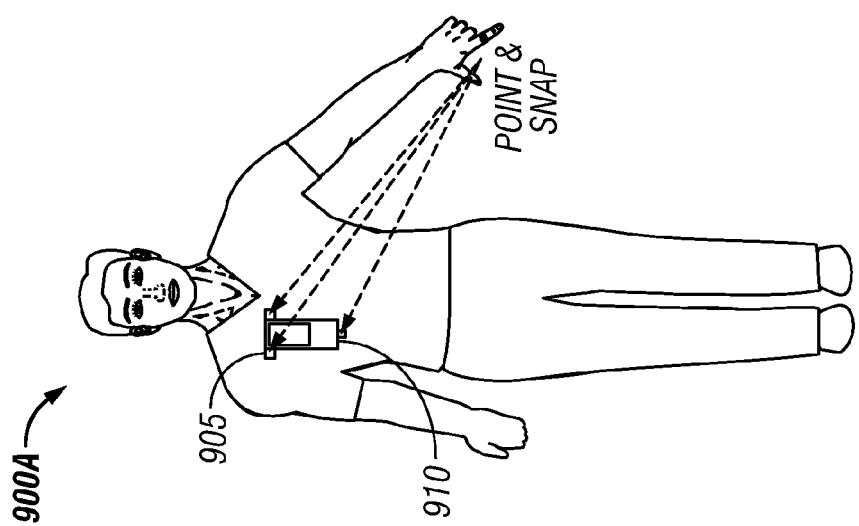

SYSTEM AND METHOD FOR SELECTION OF AN OBJECT OF INTEREST DURING PHYSICAL BROWSING BY FINGER POINTING AND SNAPPING

BACKGROUND OF THE INVENTION

1. Field of the Invention

The invention relates to physical browsing systems and methods and in particular, to systems and methods enabling selection of objects in a physical environment.

2. Description of the Related Technology

Browsing is typically done by searching for information on a network, e.g. the Internet, using a search engine. A search engine is a system for information retrieval used to help find information stored on a computer system, such as on the World Wide Web, inside a corporate or proprietary network, or in a personal computer. Search engines typically allow a user to specify textual criteria and retrieve a list of items that match those criteria.

Browsing is typically done at a computer or other type of communication device, e.g., a text pager, mobile phone or PDA (personal digital assistant), which has an input mechanism for inputting text. However, if a user does not have such an input device, or is performing some other action that does not permit him to use such an input device, then browsing is difficult if not impossible.

Recently, the addition of geo-tagging and geo-parsing has been added to certain documents or indexed items, to enable searching within a specified locality or region. Geo-parsing attempts to categorize indexed items to a geo-location based frame of reference, such as a street address, longitude and latitude, or to an area such as a city block, municipalities, counties, etc. Through this geo-parsing and geo-tagging process, latitudes and longitudes are assigned to the indexed items, and these latitudes and longitudes are indexed for later location-based query and retrieval.

SUMMARY OF CERTAIN INVENTIVE ASPECTS

The systems and methods of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the sample features of this invention provide advantages that include efficient and precise selecting of physical objects within a physical environment and subsequently obtaining and/or generating information about the selected objects.

An aspect provides a system for selecting an object from a plurality of objects in a physical environment. The system of this aspect includes a plurality of acoustic sensors, a sound analysis subsystem configured to analyze acoustic data received by the plurality of acoustic sensors, the sound analysis subsystem further configured to detect a snapping sound, determine the relative direction of the snapping sound, and estimate the distance to an object based on loudness measurements of the snapping sound detected in the acoustic data. The system further includes an object location subsystem configured to determine the location of the object relative to the system based at least in part on the determined direction, the estimated distance to the object and a location of the system.

Another aspect provides a method of selecting an object from a plurality of objects in a physical environment. The method of this aspect includes analyzing acoustic data received by a plurality of acoustic sensors, detecting a snapping sound in the acoustic data, determining the direction of the snapping sound, estimating the distance to an object based on loudness measurements of the snapping sound detected in the acoustic data, and determining the location of the object relative to the system based at least in part on the determined direction, the estimated distance to the object and a location of the system.

BRIEF DESCRIPTION OF THE DRAWINGS

FIGS. 9A, 9B and 9C are diagrams illustrating examples of systems for selecting an object from a plurality of objects in a physical environment using finger snapping.

DETAILED DESCRIPTION OF CERTAIN INVENTIVE EMBODIMENTS

The following detailed description is directed to certain specific sample aspects of the invention. However, the invention can be embodied in a multitude of different ways as defined and covered by the claims. In this description, reference is made to the drawings wherein like parts are designated with like numerals throughout.

Embodiments of physical browsing including object selection, geo-location determination and obtaining and/or generating information regarding the object are described. One embodiment of object selection includes optical analysis of an object framed by an aperture, where the aperture may comprise a user's fingers. Another embodiment of object selection includes finger snapping and pointing by a user and analysis of the snapping sound to locate the object to be selected.

Physical Browsing System

As used herein, physical browsing is a method of accessing information about a physical object by physically selecting the object itself. Digital information is mapped onto physical objects in one or more domains. Digital information may be geo-tagged to an object that maintains a fixed location such as a landmark (e.g., a building, a tourist attraction, etc.). Digital information may be linked to the identity of an object which is mobile or which there are more than one instance (e.g., an apple, a type of car, a species of bird, etc.).

Physical browsing may offer people in mobile settings a way to select an object of interest by identifying the object in one way or another, such as, for example, identifying the location of a fixed object or identifying an object by its appearance. For example, a person encounters a monument in a park and would like to know more about it. In the case of a geo-tagged object, he determines the location of the monument, e.g., latitude and longitude, and queries one or more geo-indexed databases and retrieves information about the monument. In the case of a non-geo-tagged object, the identity of the object is established, e.g., an image of the object is captured, and the identifying data (the image) is used as the basis for the search.

Figure 1:
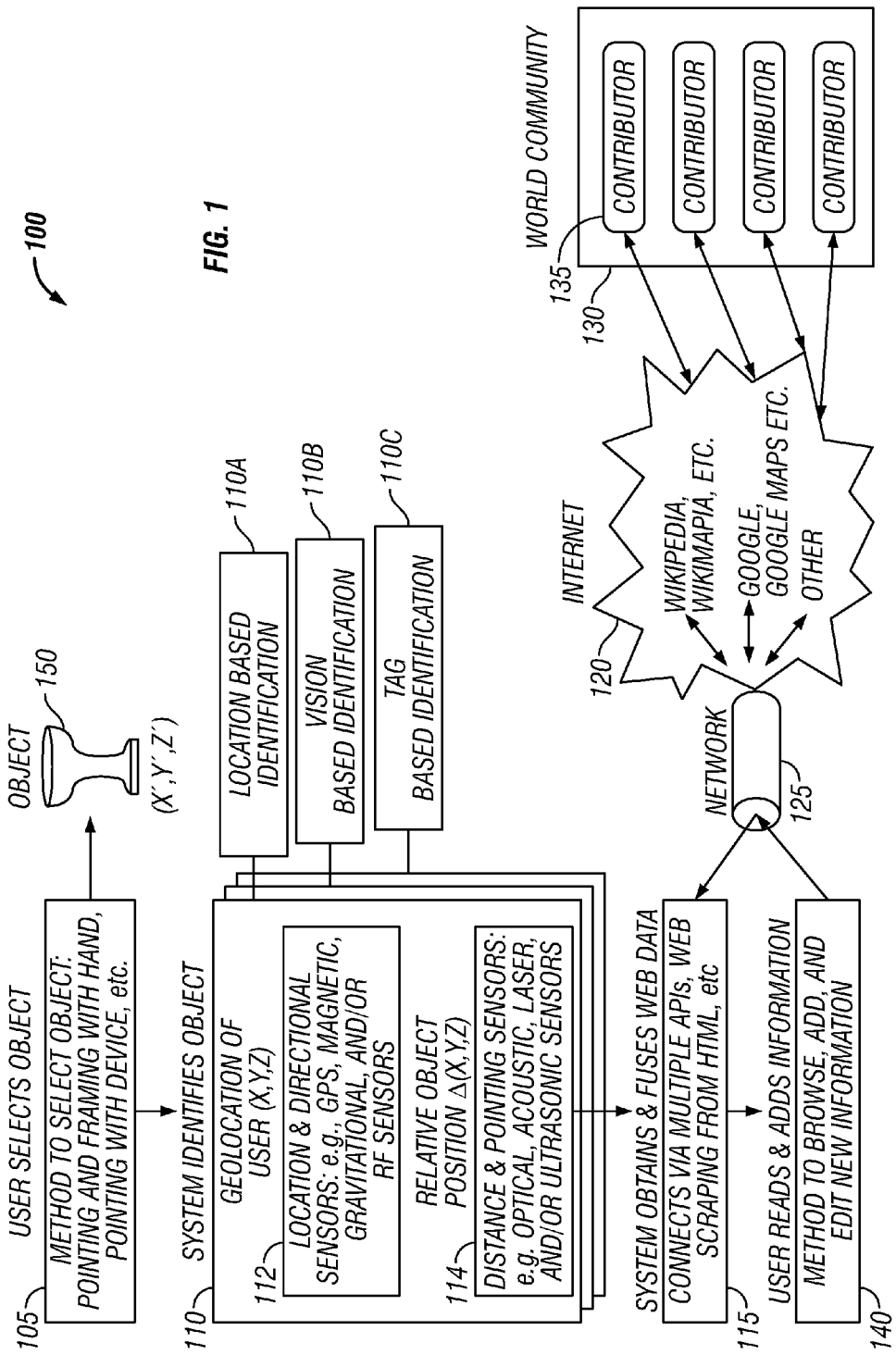
FIG. 1 is a system level block diagram of an example system for performing physical browsing.

FIG. 1 is a system level block diagram of an example system 100 for performing physical browsing. At block 105, a user selects an object 150 of interest. The method to select the object may take many forms, such as, for example, pointing at the object, framing with hands, or pointing with a device. At block 110, a physical browsing system identifies the object using one or more methods of identification. For example, a location based identification methodology 110A comprises determining the geo-location of the user using a location system 112. The location system 112 may use a combination GPS system with inertial sensors (e.g., a compass and an inclinometer), a camera estimated motion system, or an auxiliary RF signal such as in a cellular telephone network. In addition, an object location system 114 determines the location of the object being selected relative to the user. Combining the location of the user with the relative location of the object, the physical browsing system determines the absolute location (e.g., geo-location) of the object being selected. Other methods of identifying the object being selected include a vision based identification methodology 110B and a tag based identification system 110C.

After the identity of the object is determined at the block 110, the physical browsing system obtains and fuses informational data (e.g., web data) from one or more sources at block 115. In one embodiment, the physical browsing system may have an internal memory storing location information (e.g., an absolute geo-location or a local location such as a location in a building) that is cross referenced with object identification information. In one embodiment, the physical browsing system queries the Internet 120 over a network 125. The network 125 may include one or more wired and/or wireless networks. The query may include the location information determined for the object being selected. Internet services such as search engines or encyclopedia type information databases may contain cross referenced object location and object identity information. The physical browsing system can connect via one or more API's performing "Web Scraping" to obtain information related to the object 150. Such a physical browsing system, as shown in FIG. 1, allows a user to obtain object specific information from a world community 130 including multiple contributors 135. The user himself can be a contributor by adding information that he obtains about the object at block 140. In this way the user is an information contributor to the physical browsing system. Details of two location based object selection for use in a physical browsing system are discussed below.

Optical-Based Object Selection

Figure 2:
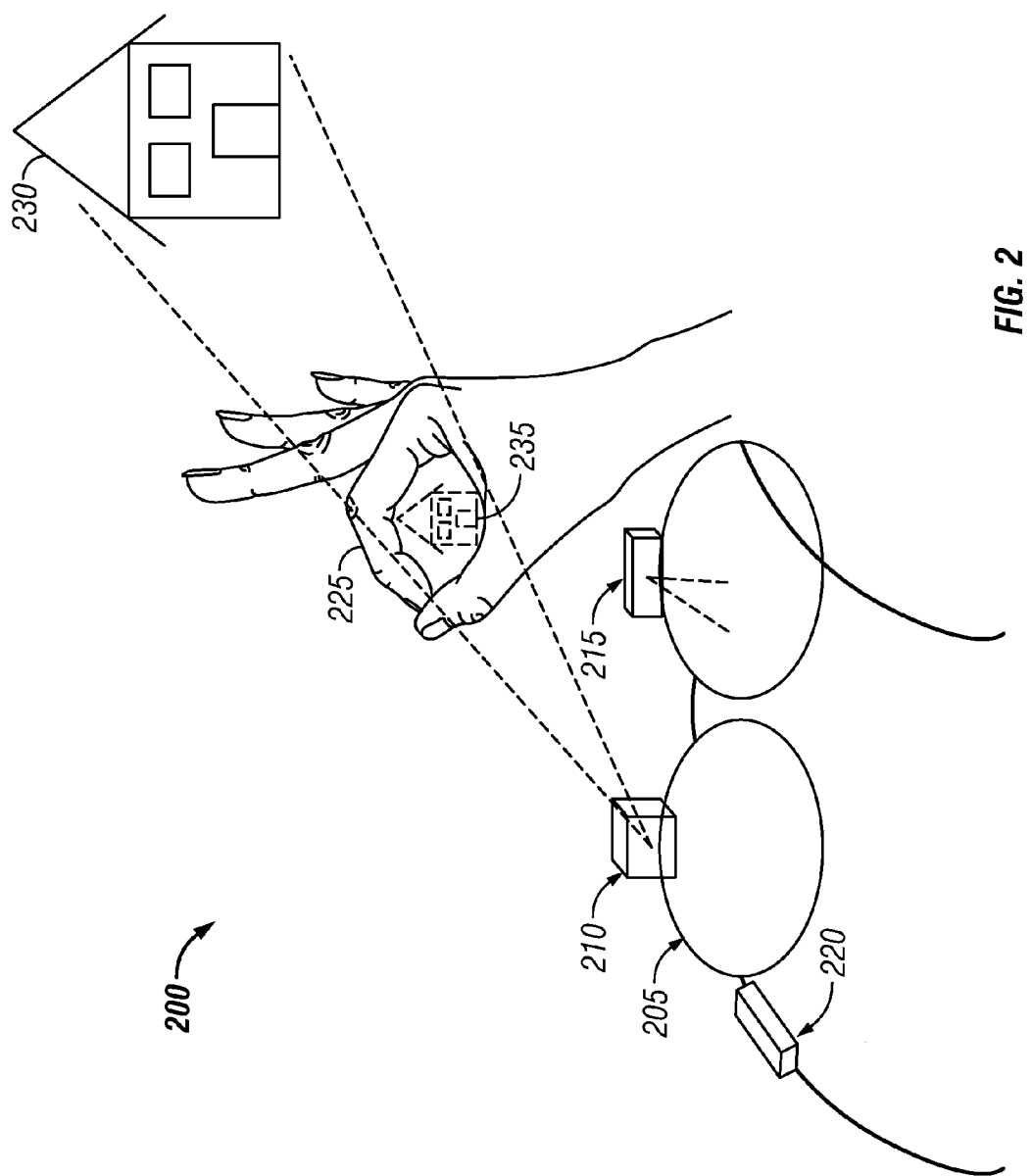
FIG. 2 is a diagram illustrating an example of a system for selecting an object from a plurality of objects in a physical environment using finger framing.

FIG. 2 is a diagram illustrating an example of a system for selecting an object from a plurality of objects in a physical environment using finger framing. System 200 is an optical-based system for selecting an object. The system 200 includes a pair of eyeglasses 205, an imaging sensor 210, a sensor 215 for detecting a wink of a user, a location and directional sensor system 220 and an aperture 225 comprising the fingers of a user. In the system 200, the user selects an object of interest, e.g. a house 230, by closing one eye (winking) and adjusting the distance from the open eye to the finger frame aperture such that the house 230 is substantially encompassed by the finger frame aperture 225 as depicted by the projected house image 235. The embodiment of the system 200 is mounted on the eyeglasses 205. However, other embodiments may be mounted on a hat, a visor, sunglasses, a cap, flip-down glasses, etc. Other forms of mounting structure may also be used.

The imaging sensor 210 may include an infrared (IR) imaging sensor for detecting the presence of the finger frame aperture 225. An infrared imager with a range of about 100 cm may be sufficient to detect hands and/or fingers at ranges up to the length of a normal arm. A natural light imager may also be used as the sensor 210 for detecting the finger frame aperture 225. Alternatively, a depth camera sensor (e.g., DeepC, the chip set used in 3DV Systems' Z-sense depth camera) may also be used as the sensor for detecting the finger frame aperture. In addition to detecting the presence of the aperture 225, the sensor 210 also detects the object 230. In one embodiment, an image of the object 230 without the aperture 225 being present is used for determining the distance to the object 230 using an imager with multiple autofocus zones or other depth detecting sensors and methods. An infrared or natural light imager may be used for detecting the object 230. In addition to determining the distance to the object 230, image analysis may be used to determine the size of the object as well as the identity of the object, depending on the embodiment. The imaging sensor 210 generally points in the direction that the user is viewing the object 230, e.g., in front of the user.

The wink detection sensor 215 detects when a user winks in order to view the object 230 through the aperture 225. The wink is a natural reaction when a user wants to view an object within an aperture in order to avoid double images caused by stereoscopic vision. In one embodiment, if the user holds the wink for greater than a threshold amount of time, then the wink sensor 215 produces a signal indicating that an object selection process has been triggered. When the triggering signal has been produced, the imaging sensor 210 detects the aperture 225. Further details of the object selection process used by the system 200 will be discussed below in reference to FIGS. 7-8.

The wink detection sensor 215 may be an IR detector including a close range IR illuminator which determines the reflection of the IR beam on the cornea. A closed eyelid will not reflect IR light in the same way as an open eye. The range of the IR detector/illuminator may be about 3 cm. in the case of being mounted on the eyeglasses 205. For a visor mounted wink detection sensor, the range may be greater, up to about 15 cm.

Normal eye blinks (both eyes) are short in length. In contrast, a wink for viewing the object will generally last for a longer time. A threshold time of about 500 ms may be used to distinguish normal eye blinks from object selection related winks. An alternative embodiment may use two wink sensors 215, one for each eye, to detect if only one eye is closed.

The location and directional sensor system 220 may include a geo-location device such as a GPS (global positioning system) system. The location and directional sensor system may include a GPS antenna and a GPS receiver. The GPS antenna could be mounted on the eyeglasses as depicted in FIG. 2, and the GPS receiver could be contained in a processing system such as a PDA, mobile phone or pocket computer, etc. The GPS system is used to determine the absolute location of the user and therefore the system 200 in terms of latitude and longitude, for example. In addition to the geo-location sensor, the sensor system 220 also includes a directional subsystem such as a compass and inclinometer. The directional subsystem is used to determine the absolute direction that the user is facing when viewing the object 230 during the selection process. The geo-location and viewing direction information, when combined with the relative distance to the object and the relative pointing direction as determined by the imaging sensor 210, may be used to determine the absolute location of the object being selected. Thus, a geo-tagged database may be queried to identify the object being selected.

The subsystems of the system 200 may communicate wirelessly or via wires with a computing system of the user such as a mobile phone, PDA, pocket computer, etc. The processor of the computing system may receive signals from the sensors 210, 215 and 220 and serve as the central processor for performing the analysis and other functions for selecting the object. As discussed above the GPS receiver of the location and directional sensor system 220 may be located in the device containing the central processor.

Figure 3A:
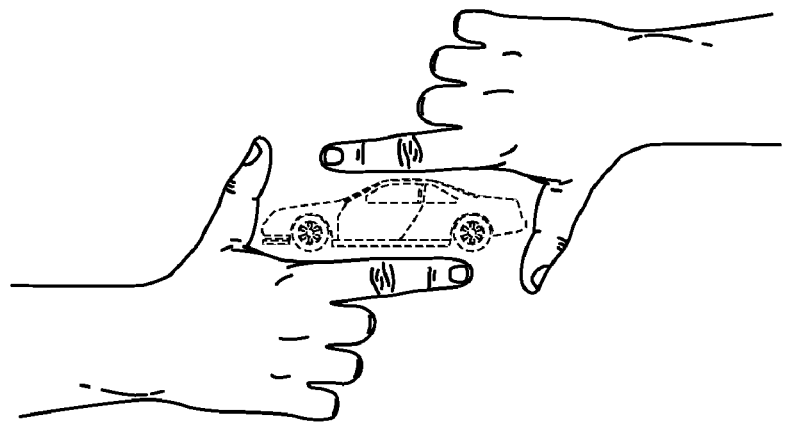
FIGS. 3A, 3B, 3C and 3D are diagrams illustrating examples of different finger framing techniques that may be used in a system such as illustrated in FIG. 2.
Figure 3B:
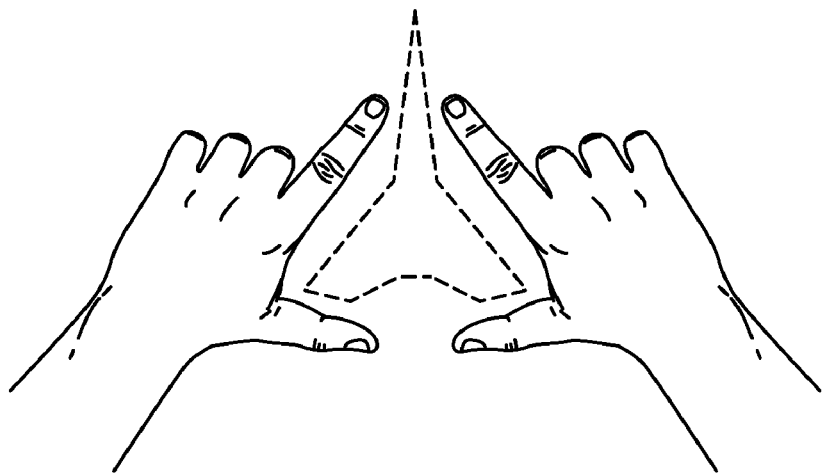
Figure 3C:
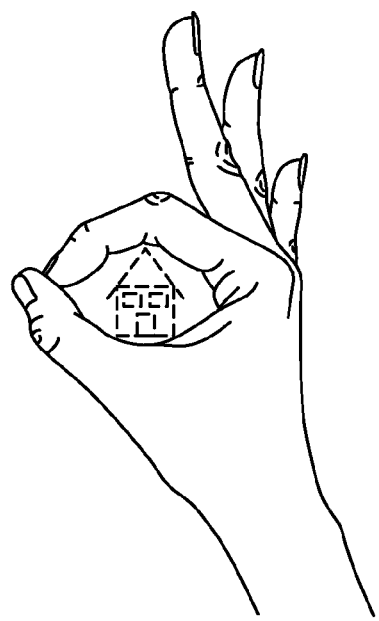
Figure 3D:
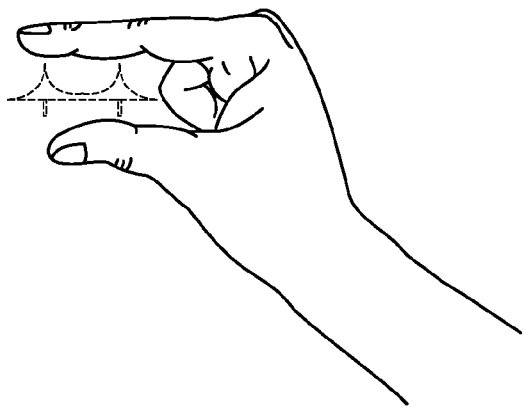

FIGS. 3A, 3B, 3C and 3D are diagrams illustrating examples of different finger framing techniques that may be used in a system such as illustrated in FIG. 2. FIG. 3A illustrates a two-handed movie director type of framing gesture utilizing a rectangular (or square) formation to frame an automobile. FIG. 3B illustrates a two-handed frame in the shape of a diamond or triangle used to frame the Eiffel Tower. FIG. 3C illustrates a circular "OK" gesture used to frame a house. FIG. 3D illustrates using a picking-up gesture to frame a bridge. Other forms of finger framing may also be used.

Figure 3E:
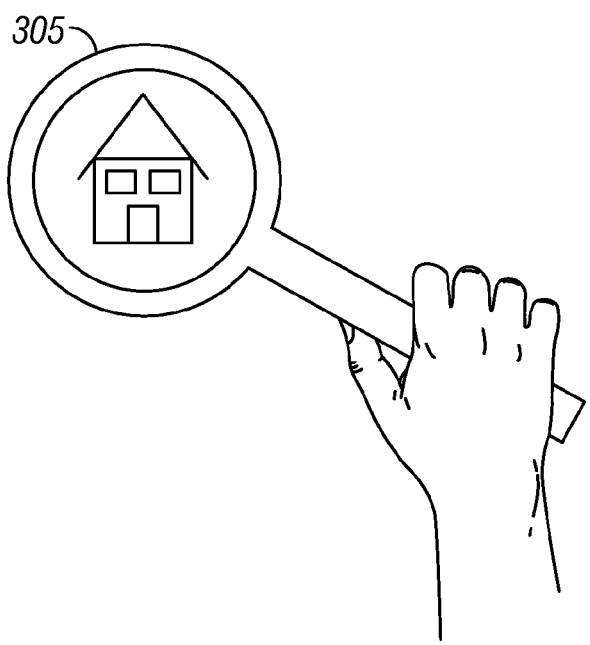
FIGS. 3E and 3F are diagrams illustrating examples of other apertures that may be used for framing an object in a system such as illustrated in FIG. 2.
Figure 3F:
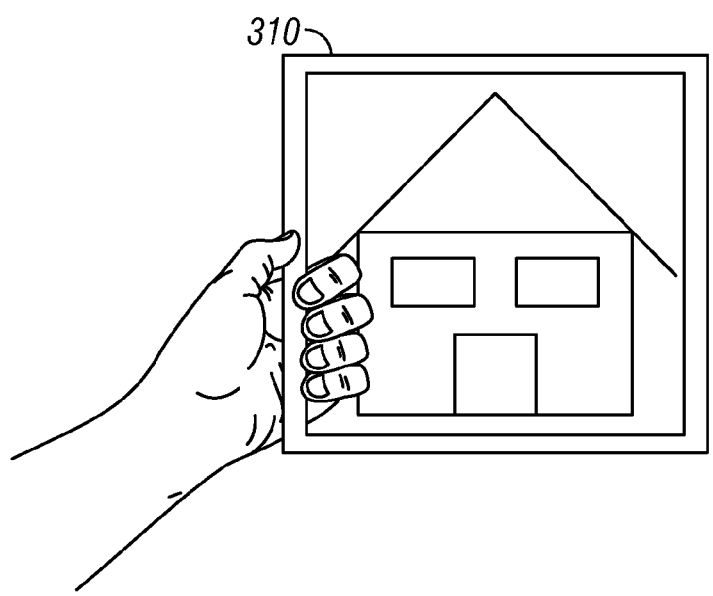

In addition to finger frames used to form the aperture, other devices may be used. FIGS. 3E and 3F are diagrams illustrating examples of other apertures that may be used for framing an object in a system such as illustrated in FIG. 2. FIG. 3E illustrates using a wand 305 including a circular aperture for framing a house. Wands including differently shaped apertures, such as triangular, square, rectangular, etc., may also be used in a similar manner. FIG. 3F illustrates using a rectangular picture frame 310 for framing a house. Again, differently shaped picture frames may also be used.

Figure 4:
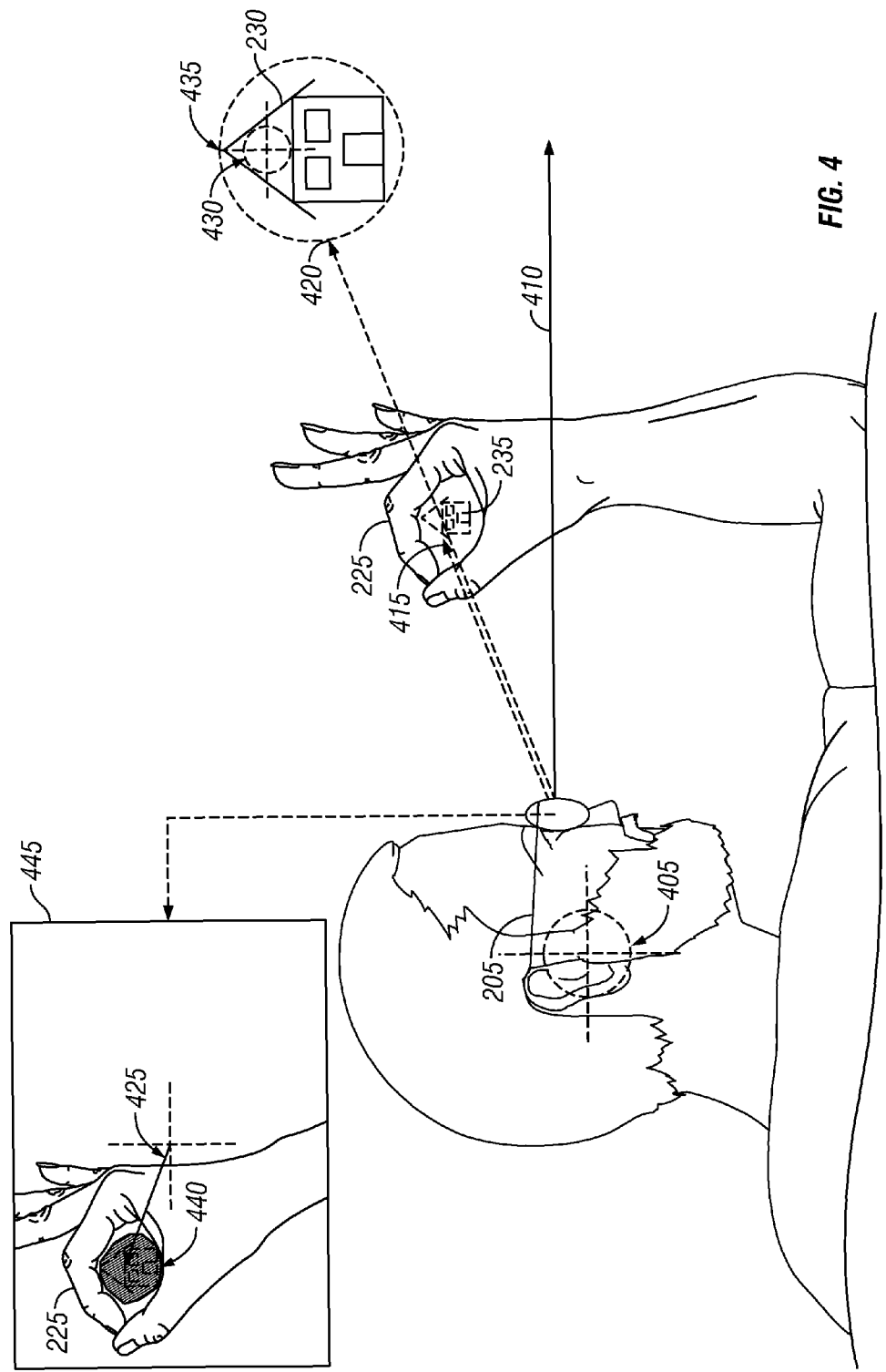
FIG. 4 is a diagram illustrating parameters that are used and/or calculated by a system such as illustrated in FIG. 2.

FIG. 4 is a diagram illustrating parameters that are used and/or calculated by a system such as illustrated in FIG. 2. The GPS antenna of the location and directional sensor platform 220 of FIG. 2 provides the absolute head position (AHP) 405 of the user wearing the glasses 205. The absolute head position may be in any three dimensional coordinate system such as Cartesian (x, y, z) or spherical coordinates (radius, latitude, longitude), etc. The compass and inclinometer sensors of the location and directional sensor platform 220 can provide the absolute head orientation vector (AHO) 410. A relative pointing direction (RPD) vector 425 can be determined by analyzing image data captured by the imaging sensor 210 of the object 230 when the aperture is present in the image (as depicted in image 245 in FIG. 4). The imaging sensor 210 can provide an absolute distance to the object (ADO) 420. In one embodiment, the ADO 420 can be obtained using the autofocus system of the imaging sensor 210. By transforming the RPD vector 425 to the same coordinate system as the AHP 405 and the AHO vector 410, the absolute object position (AOP) 430 can be determined by adding a vector with a length equal to the ADO 420 in the direction of the RPD vector 425 to the AHP 405.

As discussed above, in addition to determining the AOP 430, the system 200 can also be used to determine an absolute object size (AOS) 435. In one embodiment, the AOS 435 is determined based on a relative size of the object (RSO) 440 in the image 245 obtained by measuring the dimensions of the aperture 225 (e.g., in pixels) that substantially encompasses the object 230 (the projected object 235 is illustrated as being substantially encompassed by the aperture 225 in FIGS. 2 and 4). The RSO 440 can be determined using image analysis of an image captured when the aperture 225 is present (this event may be triggered by the user winking as discussed above).

Figure 5:
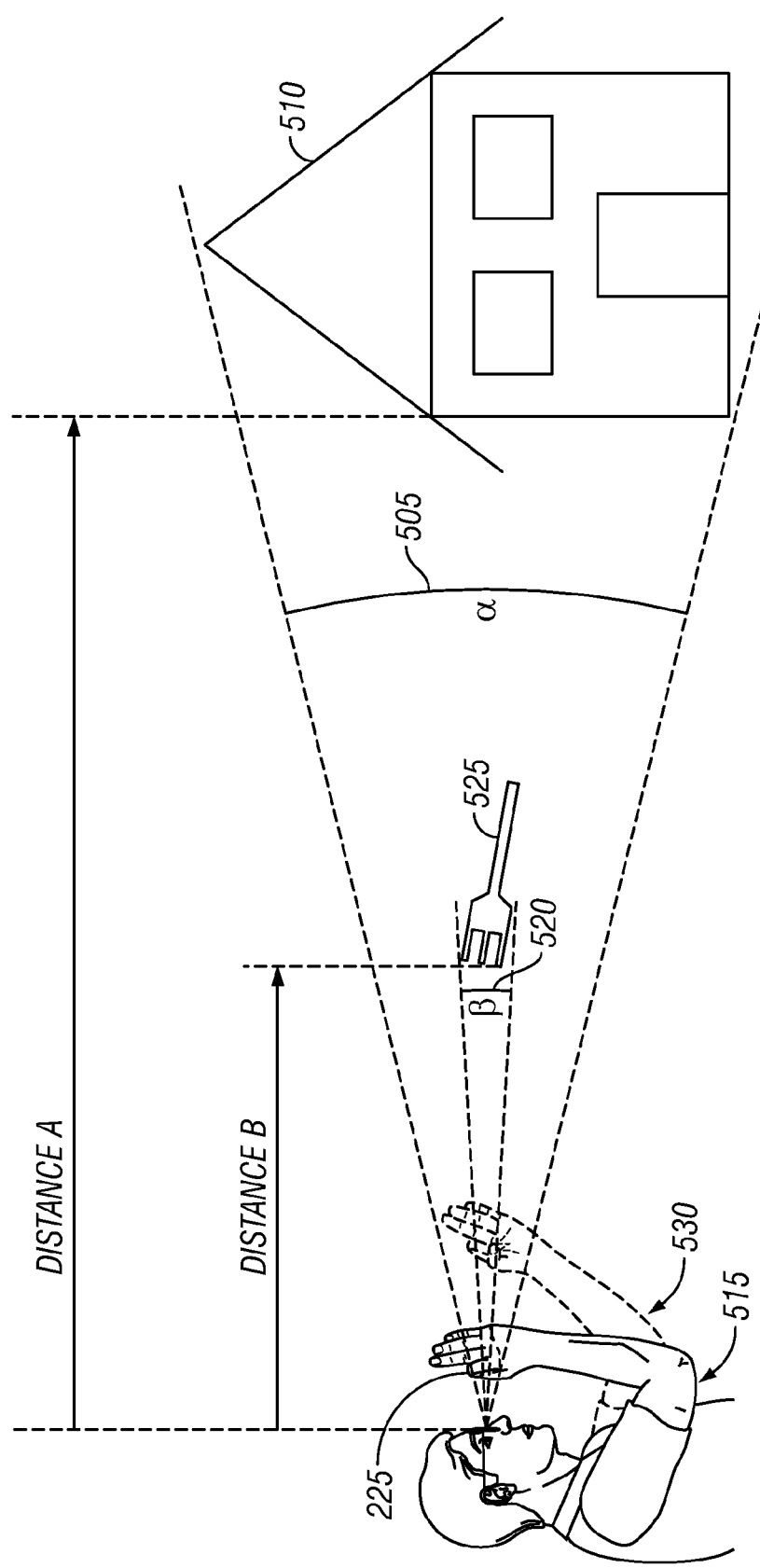
FIG. 5 is a diagram illustrating a method of estimating the size of an object selected by a system such as illustrated in FIG. 2.

FIG. 5 is a diagram illustrating a method of estimating the size of an object selected by a system such as illustrated in FIG. 2. The AOS 435 can be determined by determining a viewing angle (VA) of the aperture 225 when the wink event is triggered and combining this with the absolute distance to the aperture (ADA) 415 and the ADO 420 discussed above. Two example viewing angles are depicted in FIG. 5. A first viewing angle 505 is depicted for a user viewing a house 510 located a distance A from the user. For viewing the relatively large house at the distance A, the user positions his arm at a first position 515 such that the aperture 225 has an ADA 415 relatively close to the eye of the user. A second example viewing angle 520 occurs when the user is viewing a small fork 525 at a distance B. For viewing the fork 525, the user positions his arm using a second position 530 including a larger ADA 415. The distances A and B are examples of the ADO 420 as discussed above. The RSO 440 can be determined as discussed above for either arm position 515 or 530. One example method of determining the AOS 435 based on the RSO 440 will now be discussed.

A thin lens approximation can be used to estimate the ADO 420 and the AOS 435 based on the RSO 440 obtained from the captured image (with or without the aperture 225 present, depending on the embodiment). The thin lens approximation ignores optical effects due to the thickness of the lenses and assumes simplified ray tracing calculations. These calculations are only an example, and other optical relationships, known to skilled technologists, may also be used. The following variables will be used in the thin lens equations:

d1=distance between the lens and the object (ADO 420 in FIG. 4)

d2=distance between the lens and the sensor capturing the image (not shown)

h1=object size (AOS 435 in FIG. 4)

h2=image size on sensor (RSO 440 in FIG. 4)

f=focal length of the lens

The following relationship is used in the thin lens approximation to show the relationship between d1, d2 and f:

$$1/f = 1/d1 + 1/d2 \quad (1)$$

Solving for "d2" results in:

$$d2 = 1/((1/f) - (1/d1)) \quad (2)$$

For thin lenses, the distances d1 and d2 are proportional to the object size h1 and image size h2 as follows:

$$d1/d2 = h1/h2 \quad (3)$$

which can be rewritten as:

$$h1 = h2 * d1/d2 \quad (4)$$

Substituting for d2 in Equation (4) with the relationship given by Equation (2), gives the following equation for object size h1:

$$h1 = h2*d1(1/f - 1/d1) = h2*((d1/f) - 1) \quad (5)$$

which shows that the object size h1 (or AOS 435) is a function of the image size h2 (or RSO 440), the focal length "f" of the lens, and the distance from the lens to the object (or ADO 420). If the RSO 440 is determined in pixels as discussed above, then the size of the image h2 is a function of the RSO 440 and the pixel density of the image sensor as follows:

$$h2 = RSO/\text{pixel\_density} \quad (6)$$

where pixel density can be in pixels per millimeter on the image sensor, for example. Substituting AOS 435, ADO 420 and Equation (6) for h1, d1, and h2, respectively, in Equation (5), results in the following relationship for the AOS 435:

$$AOS = (RSO/\text{pixel\_density})*((ADO/\text{focal\_length}) - 1) \quad (7)$$

As discussed above, other relationships can be used to represent the optical effects of the lens in relating the AOS 435 to the RSO 440 and the ADO 420. In general, equation (7) can be represented by the following function:

$$AOS = \text{linear function of }(ADO, RSO, k) \quad (8)$$

Where k (a constant) depends on primary factors including focal length and pixel density, but can also depend on secondary factors. Secondary factors affecting the constant k may include lens distortion, sensor scaling, imaging sensor imprecision and/or lens imprecision. The secondary factors may be a function of object distance and/or relative position of the object to the center of the lens.

Since the constant k can depend on variables that may not be consistent from lens to lens, and may vary depending on where the object is relative to the lens, the imaging system may be calibrated to identify the constant k as a function of these other variables. Calibration may include using an object of a known size (e.g., 1 m diameter), and taking multiple images of the object at known distances (e.g., 1 m, 2 m, 3 m etc.) and multiple x and y positions relative to the center of the lens. By counting the pixels of each image, the value of k can be determined for a two dimensional grid for each of the distances. A mathematical approximation to k could then be made as a function of distance (ADO), and x and y location in the sensor grid. Equation (8) could then be updated with the value of k determined from the calibration data.

Figure 6A:
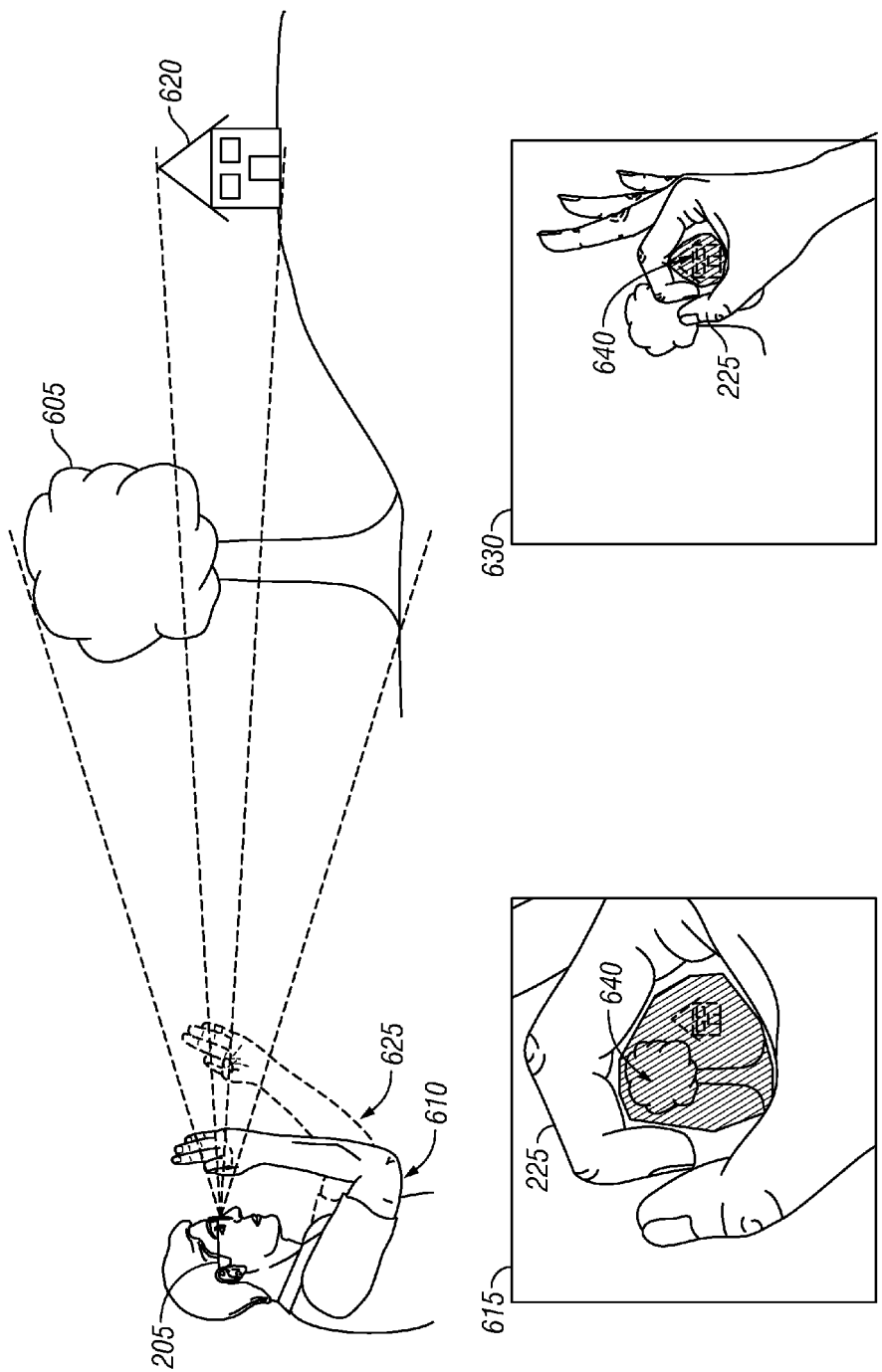
FIGS. 6A and 6B are diagrams illustrating a method of distinguishing between a plurality of objects in a physical environment using a system such as illustrated in FIG. 2.
Figure 6B:
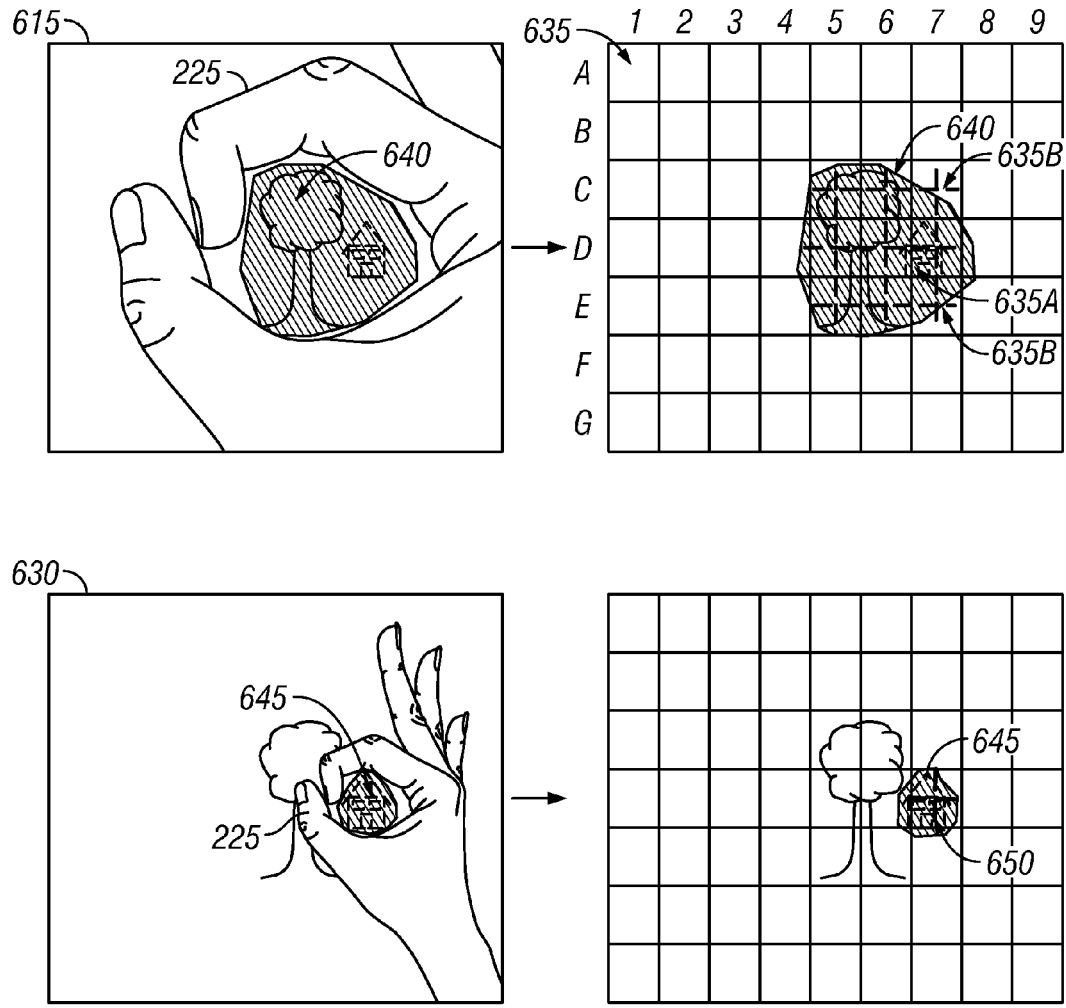

The system 200 shown in FIG. 2 can be utilized to select one object out of several closely positioned or even partially occluded objects within a single physical environment. FIGS. 6A and 6B are diagrams illustrating a method of distinguishing between a plurality of objects in a physical environment using a system such as illustrated in FIG. 2. The scenario depicted includes two selectable objects, a tree 605 and a house 620. The user selects the tree 605 by positioning his arm and finger aperture in a first position 610. The user selects the house 620 by positioning his arm and finger aperture in a second position 625.

An exploded view of the aperture, as viewed by the user, in the first position 610 is shown in close-up view 615. As can be seen, both the tree 605 and the house 620 are substantially encompassed by the aperture in the close-up view 615. FIG. 6B illustrates a method of determining whether the tree 605 or the house 620 is being selected by the user. The imaging sensor 210 of the system 200 contains independently focused zones represented by the squares 635. The embodiment illustrated has 63 independent focus zones 635 (9 columns labeled 1-9 and 7 rows labeled A-G). The number of focus zones in this example is 63, but any number of focus zones could be used, including more or fewer than 63. The area 640 encompassed by the aperture 225 includes 6 zones 635 that focus on the tree 605 at a close distance, one zone 635A focused on the house 620 at a farther distance, and two zones 635B focused on background. Although the zone 635A containing the house and the zones 635B containing the background are within the area 640 encompassed by the aperture 225, the majority of the zones 635 (6 out of 9 zones in this example) are focused on the tree 605. Thus the tree 605 can be determined to be the object being selected by majority rule. As an alternative to an auto focus camera, a depth camera, as discussed above, could be used to identify the depth of the objects within the aperture and distinguish between the objects based on the depth of the objects at different positions and the area of each object at each depth.

An exploded view of the aperture, as viewed by the user, in the second position 625 is shown in close-up view 630 in FIG. 6B. As can be seen, only the house 620, not the tree 605, is substantially encompassed by the aperture in the close-up view 630. Referring to FIG. 6B, the aperture 225, illustrated in the close-up view 630, encompasses an area 645 that only includes the house. The area 645 includes only one focus zone 650 which is focused on the house 620. Thus, it may be determined that the house is the object being selected in this case.

Figure 7:
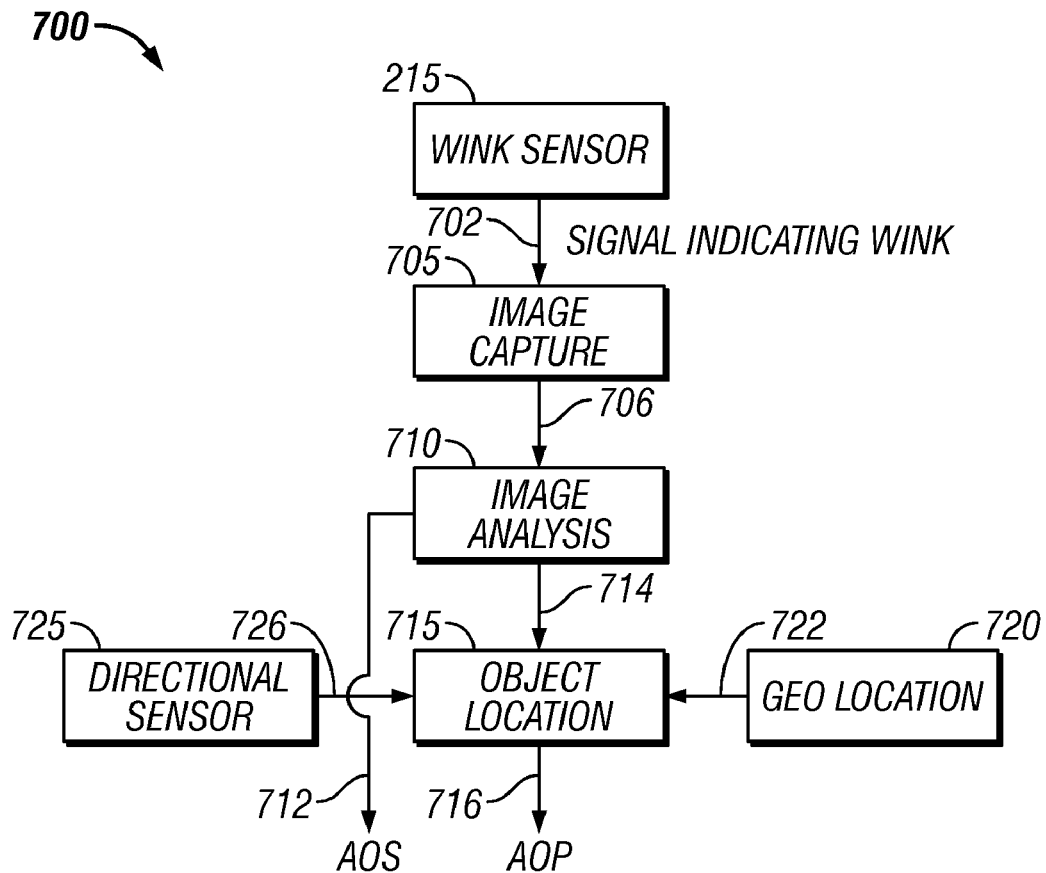
FIG. 7 is a block diagram illustrating an example of object selection in a system such as illustrated in FIG. 2.

FIG. 7 is a block diagram illustrating an example of object selection in a system such as illustrated in FIG. 2. The process 700 starts where a wink of the user is detected by the wink detection sensor 215. In one embodiment, if the user holds the wink for greater than a threshold amount of time (e.g., 500 ms), then the wink detection sensor 215 produces a signal 702 indicating that an object selection process has been triggered. Providing for this threshold wink-duration reduces the chances of false triggering due to normal eye blinks.

An image capture subsystem 705 receives the triggering signal 702 from the wink detection sensor 215 and captures an image of the aperture and the object encompassed by the aperture. The image capture subsystem 705 comprises the imaging sensor 210 discussed above which may include an infrared (IR) imaging sensor and/or a natural light imager as discussed above. The image capture subsystem 705 outputs data 706 of the captured image including the aperture and the encompassed object that was captured in response to the triggering signal 702.

An image analysis subsystem 710 receives as input the image data 706 of the aperture and the encompassed object. The image analysis subsystem 710 analyzes the data 706. When an aperture is detected, the image analysis subsystem 710 calculates the aperture's pixel size in the image, as well as the aperture's location in the image, as discussed above. In one embodiment, receiving the image data 706 includes receiving a first image including the aperture and receiving a second image without the aperture present. In this embodiment, the image capture subsystem 705 captures a second image without the aperture being present. A second set of data 706, not including the aperture, is output by the image capture subsystem 705 and analyzed by the image analysis subsystem 710 to determine that the aperture is not present in the data. After having captured an image without aperture, the distance to the object encompassed by the aperture is determined. In another embodiment, a single captured image, including the aperture, can be used by the image analysis subsystem 710 to identify the relative location of the object. This embodiment can be performed if the resolution of the multi zone focus system (the amount of separate zones for focus measurements) is high enough so that the system can measure the distance of an object through the aperture (e.g., the user's fingers) reliably. Alternatively, instead of a multi zone focus system, a depth camera could be used (e.g., DeepC, the chip set used in 3DV Systems' Z-sense depth camera), which has distance information per pixel. In either case, a second image without the aperture is not required.

Using the captured image data 706, the image analysis subsystem 710 estimates and outputs the AOS (absolute object size) 712 with the above described method and formula (e.g., Equation 7 or 8). The image analysis subsystem 710 also calculates and outputs object relative location data 714 including the ADO (absolute distance to the object) and the RPD (relative pointing direction) discussed above. Details of an example process flow for calculating the AOS 712, the ADO and the RPD are discussed below in reference to FIG. 8.

An object location subsystem 715 receives the relative location data 714 as input along with the AHP (absolute head position) 722 from a geo-location subsystem 720, and the AHO (absolute head orientation) vector 726 from a directional sensor subsystem 725. The geo-location subsystem 720 can include the GPS system, and the directional sensor subsystem 725 can include the compass and inclinometer as discussed above in reference to the location and directional sensor 220 of FIG. 2. The object location subsystem determines and outputs the AOP (absolute object position) 716 using methods as discussed above.

Figure 8:
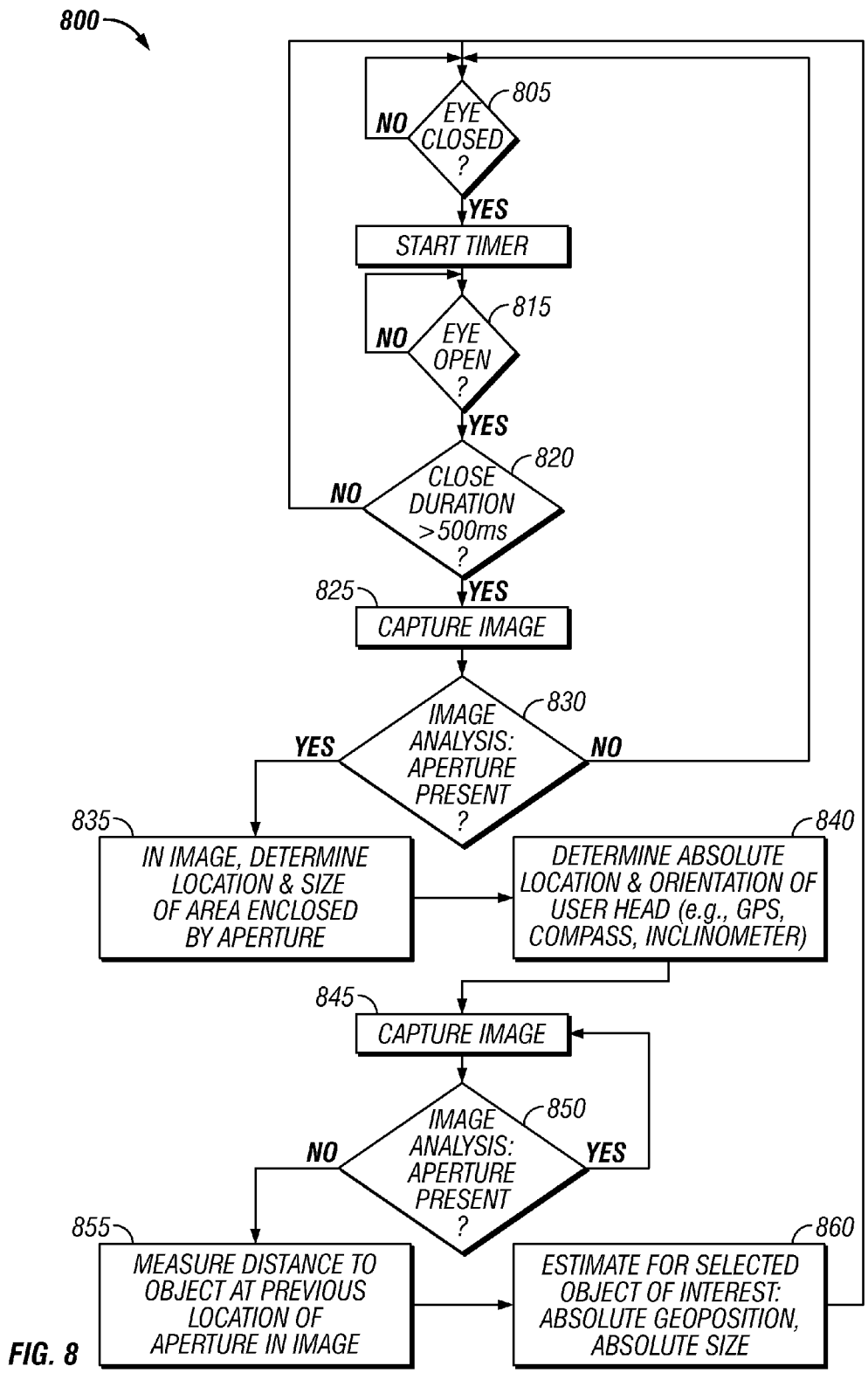
FIG. 8 is a block diagram illustrating an example of object selection in a system such as illustrated in FIG. 2.

FIG. 8 is a block diagram illustrating an example of object selection in a system such as illustrated in FIG. 2. The process 800 starts at decision block 805, where the wink sensor 215 determines if the eye of the user is closed, thereby indicating that the user may be winking. If the eye of the user is not closed, the block 805 continues until the closed eye is detected. If the user's eye is determined to be closed at the block 805, the process 800 continues to block 810, where a wink timer is started. The wink timer is used to determine if the closed eye is a wink indicating that an object selection is being initiated by the user, based on the duration of the wink in this example. After the wink timer is started at the block 810, the wink sensor 215 determines if the user opens their eye at the decision block 815. When it is determined, at the decision block 815, that the eye of the user is open again, the process 800 continues to decision block 820 where the wink sensor 215 determines whether the duration of the possible wink event exceeded a threshold of 500 ms in this example. Other time thresholds, or time windows (including lower and upper limits), could also be used. If the time threshold is exceeded, the process continues to block 825. If it is determined that the time threshold is not exceeded at the block, then the process 800 continues back to the decision block 805 to detect the start of another possible wink event.

Subsequent to determining that a wink longer in duration than the 500 ms threshold has occurred, the process 800 continues at the block 825, where the image capture subsystem 705 (see FIG. 7) captures a first image. At block 830, the image analysis subsystem 710 identifies whether an aperture that the user has positioned to encompass the object to be selected is present. If the image analysis subsystem determines that the aperture is not present, the process 800 returns to block 805 to identify another possible wink event. In some embodiments, the aperture comprises one or more portions of the user's hands and/or fingers as illustrated in FIGS. 3A to 3D. In some embodiments, the aperture may be a piece of hardware such as the wand or picture frame illustrated in FIGS. 3E and 3F, respectively. At block 830, image analysis may be used to identify the aperture using pattern recognition. In one embodiment, the image data comprises IR image data as discussed above. IR image data may be especially effective when the aperture comprises portions of the user's hands and/or fingers which are typically warmer than the other surrounding objects in the image data. However, other forms of image data may be used as discussed above.

After the image analysis subsystem 710 has identified the existence of the aperture in the image data at the block 830, the process 800 continues to block 835 where the location and size of the aperture are determined by the image analysis subsystem 710. The location of the aperture is used as the basis for calculating the RPD vector 425 as discussed above in reference to FIG. 4. The size of the interior of the aperture is used to determine the RSO 440 shown in FIG. 4. Standard image analysis techniques know to skilled technologists may be used to determine the RPD 425 and the RSO 440 at block 835.

The pixel size of the aperture, or RSO 440, can be an interior radius of the aperture in the case of a circular or nearly circular aperture. The RSO 440 may also be a height and width measurement in other cases. Other measures related to the size of the aperture may also be used. Data representing the size and distance of the aperture determined at the block 835 is used at block 860, discussed below, to determine the size of the object. Details of an example of the functions performed to determine the size of the object at block 835 are discussed above in reference to FIGS. 4 and 5 and Equations (1)-(8).

After determining the location and size of the area enclosed by the aperture at block 835, the process 800 continues at block 840 where the absolute location and orientation of the user's head, the AHP 405 and AHO 410, respectively, are determined. As discussed above, the geo-location subsystem 720 can use a GPS system to determine the AHP 405, and the directional sensor subsystem 725 can use a compass and inclinometer to determine the AHO 410.

At block 845, the image capture subsystem 705 captures a second image in order to capture an image including the object, but not including the aperture. The image data representing the second image is received by the image analysis subsystem 710 and, at block 850, the image analysis subsystem 710 determines if the aperture is still present. If the aperture is still present, the process 800 loops back to block 845 to capture another image until the aperture is not present. When the aperture is determined, at decision block 850, not to be present in the image data, the process 800 continues to block 855 where the distance to the object that was encompassed by the aperture is determined. The first captured image data that was used to identify the aperture at block 835 can be used to determine which portion of the subsequent image data captured at block 845 contains the object encompassed by the image. Methods such as discussed above in reference to FIGS. 6A and 6B can be used at the block 855 for locating the object. The distance ADO can be determined based on a distance at which a passive autofocus mechanism focuses the lens of the camera when the aperture is not present in the image. The autofocus zones (as illustrated in FIG. 6B discussed above) that are in the area of the image data identified to contain the object being selected, can be used to estimate the distance to the object. The plurality of autofocus zones can be used in combination to estimate the distance to the object. Some cameras may also use a depth sensor for estimating the distance to the object at the block 855. The ADO, determined at block 855, and the RPD, determined at block 835, are included in the relative location data 714 that is input to the object location subsystem 715 as discussed above in reference to the process 700

After determining the ADO at block 855, the process 800 continues at block 860, where the absolute object geo-position (AOP) and absolute object size (AOS) are determined. As discussed above in reference to Equations (1)-(8) and FIGS. 4 and 5, knowing the pixel size of the aperture (RSO), along with the distance to the object (ADO) encompassed by the aperture (determined by the autofocus zones that cover the inside of the aperture or other methods such as depth camera sensor), and the magnification power of the camera lens, the image analysis subsystem 710 can estimate the absolute size of the object (AOS) (e.g., using methods such as illustrated in Equations (1)-(8)). Using the head position and orientation data (AHP and AHO, respectively) determined at block 840, and the RPD determined at block 835, the object location subsystem 715 can determine the absolute object position, or AOP, as discussed above. After determining the AOS and AOP at the block 860, these values may be then output by the process 800 to be used, for example, as an input to a physical browsing system as discussed above. After block 860, the current object selection process is complete, and the process 800 returns to decision block 805 to begin another object selection process. It should be noted that some of the blocks of the processes 700 and 800 may be combined, omitted, rearranged or any combination thereof.

Acoustic-Based Object Selection

An alternative to the optical-based object selection system and methods discussed above is an acoustic-based system. Instead of a user using an aperture to encompass an object and sensing this with an optical system, a system is provided that uses acoustic signals to indicate the location of an object to be selected, e.g., for purposes of physical browsing. In one embodiment, a finger snap of a user provides the acoustic signal. In another embodiment, a user may use a mechanical or electrical device to produce the acoustic signal.

FIGS. 9A, 9B and 9C are diagrams illustrating examples of systems for selecting an object from a plurality of objects in a physical environment using finger snapping. Each of the illustrated systems comprises a plurality of acoustic sensors 905 located apart from each other on a device worn by a user. System 900A in FIG. 9A includes three acoustic sensors 905 attached to a cell phone 910 worn in a chest pocket. System 900B in FIG. 9B uses three acoustic sensors attached to headphones 915. System 900C in FIG. 9C shows two acoustic sensors attached to eyeglasses 920. Other devices, such as a PDA, a pager, a radio, a MP3 player etc., could also contain the acoustic sensors 905.

In each of the systems 900A, 900B and 900C, the user points at an object in a physical environment, and makes a snapping sound with his fingers or a snapping sound producing device to point to an object to be selected. The acoustic sensors 905 pick up the snapping sound and produce acoustic data that is used by a sound analysis subsystem to determine the distance to the object to be selected as well as the direction that the user is pointing. Each of the systems 900 also includes a geo-location and directional sensor (similar to the location and directional sensor 220 shown in FIG. 2) for providing an absolute geo-location of the user and the direction the system is oriented. The relative distance and direction to the object can then be used to locate the absolute geo-location of the object being selected. The absolute location of the object can then be used in some embodiments to identify the selected object using geo-tagged data. In these embodiments, the absolute location can be contained in one or more geo-indexed databases and the selected object can be identified by looking up the location.

Figure 10:
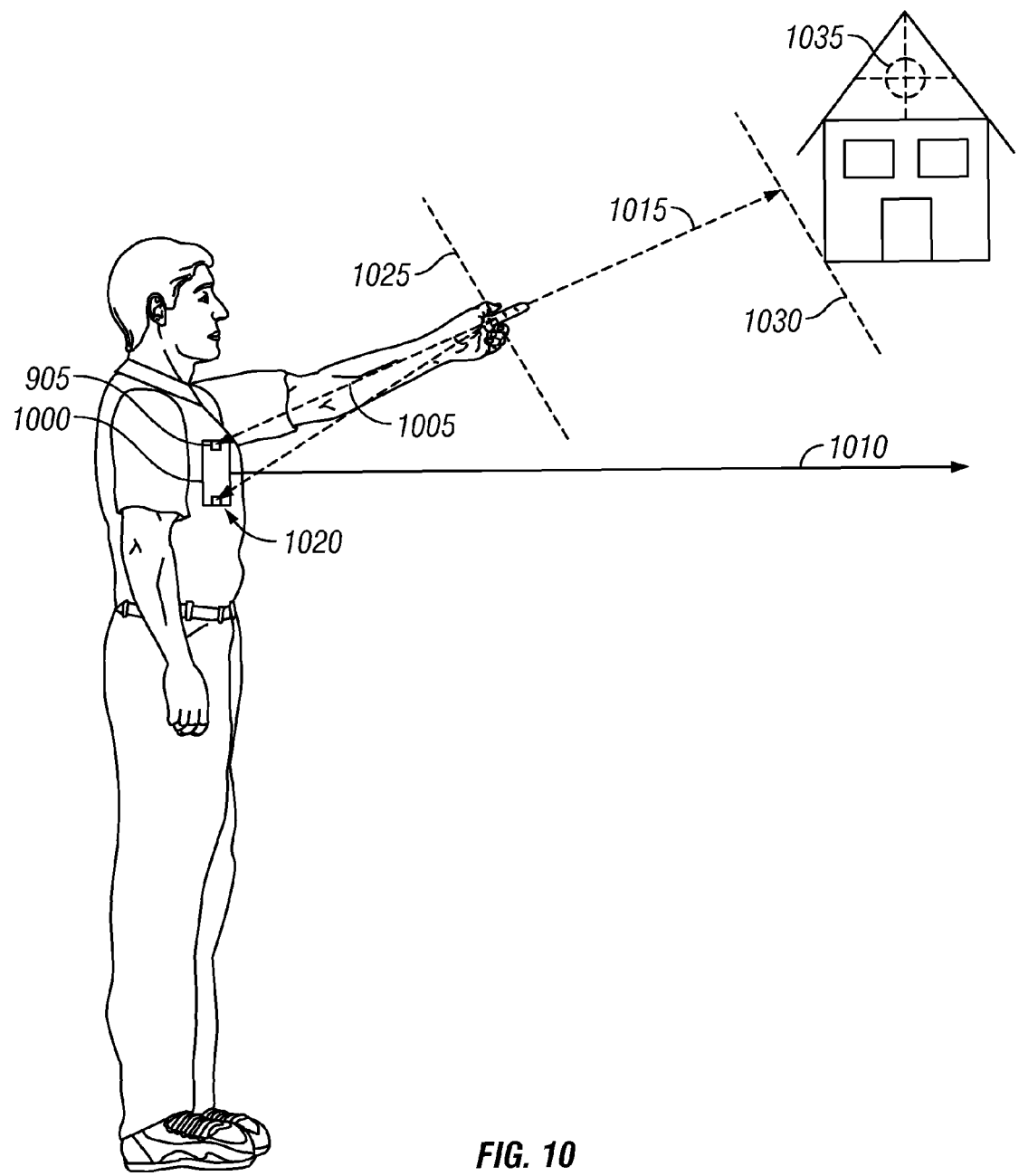
FIG. 10 is a diagram illustrating parameters that are used and/or calculated by a system such as illustrated in FIGS. 9A, 9B and 9C.

FIG. 10 is a diagram illustrating parameters that are used and/or calculated by a system such as illustrated in FIGS. 9A, 9B and 9C. A device 1000 is worn by a user. The device 1000 may be the cell phone 900A illustrated in FIG. 9A. The acoustic data produced by the acoustic sensors 905 in response to the snapping sound are used to estimate the direction of the snapping sound by measuring the delays between the arrival of the snapping sound at the different sensors (pair wise time-of-arrival differences) and the known relative locations of the acoustic sensors. In some embodiments, the device 1000 includes two acoustic sensors used to determine a two dimensional vector on a plane that intersects the two sensors, indicating the direction (angle) that the snapping sound is coming from. This vector is also the direction vector where the user is pointing and is depicted as the RPD (relative pointing direction) vector 1005. The device 1000 may include two acoustic sensors 905 in order to determine the RPD vector 1005 in two dimensions. The device 1000 may include three acoustic sensors 905 as discussed above in order to determine the RPD vector 1005 in three dimensions.

The device 1000 also includes a geo-location and directional sensor. The directional sensor may include a compass and inclinometer configured to provide an absolute device heading (ADH) vector 1010. The ADH 1010 may be combined with the RPD 1005 to determine the absolute pointing direction (APD) 1015 to the object being selected as illustrated in FIG. 10.

The geo-location sensor may comprise a GPS system or a cellular network based location system or other location sensing systems (e.g., based on WiFi signals (IEEE 802.11), visual odometery, radio and TV broadcast signals, etc). The geo-location sensor provides the absolute device position (ADP) 1020. The ADP 1020 may be in a localized coordinate system such as [x, y, z] locations in a city grid, or in latitude, longitude and elevation.

The distance to the object is determined, in one embodiment, based on the sound level of the snapping sound detected by the acoustic sensors 905. Typically, the distance to the hand from the device (DHD) 1025 determines the level of the snapping sound detected by the acoustic sensors 905. In addition, the user may be instructed to vary the distance from the device to the hand in proportion to the distance to the object.

Figure 11:
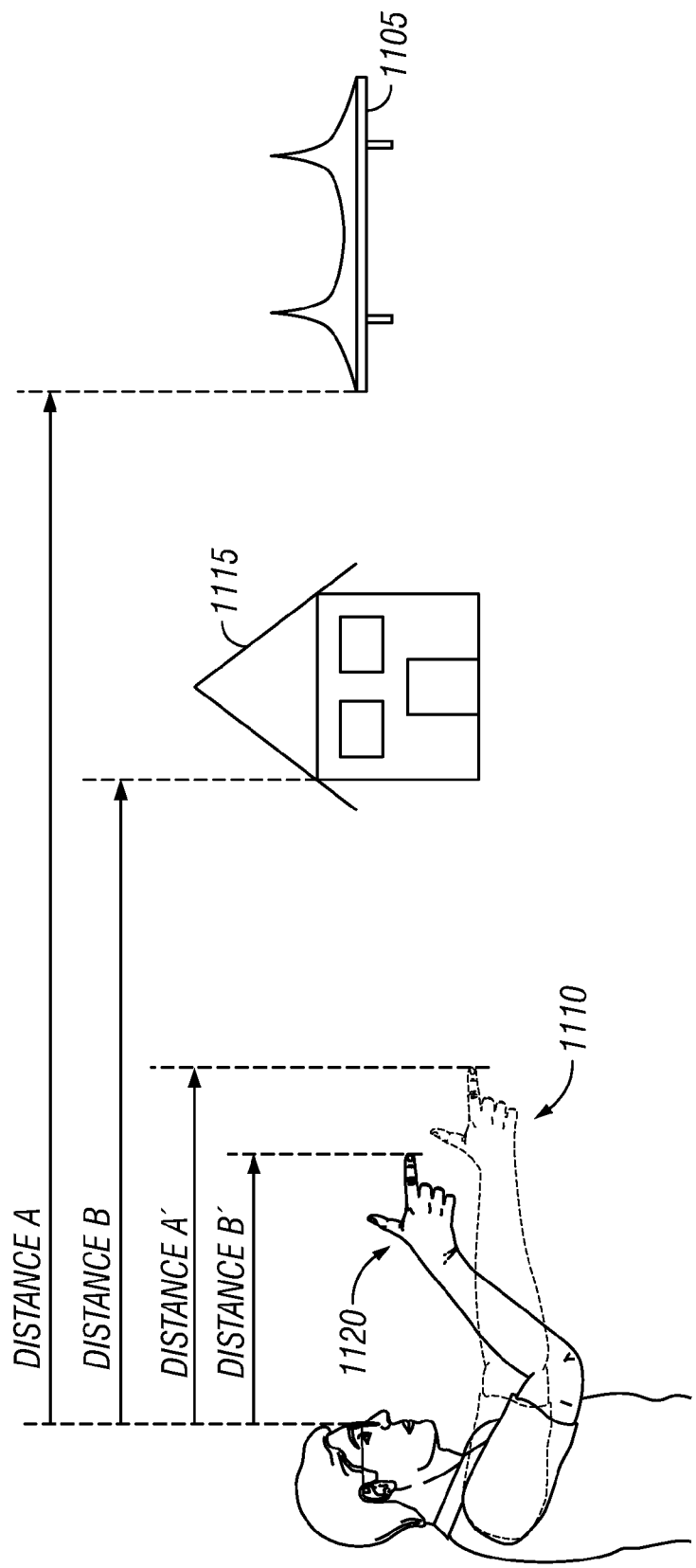
FIG. 11 is a diagram illustrating a method of estimating a distance to an object selected using a system such as illustrated in FIGS. 9A, 9B and 9C.

FIG. 11 is a diagram illustrating a method of estimating a distance to an object being selected using a system such as illustrated in FIGS. 9A, 9B and 9C. In this example, when the user is pointing at a bridge 1105 at a far distance A, the user positions his arm at a first position 1110 where the finger snap is a distance A' from the device (illustrated in FIG. 11 as a distance A' to the face of the user). In contrast, when the user is pointing at a house 1115, the user positions his arm at a second position 1120, a distance B' from the device. The distance A' is greater than the distance B' and hence indicates that the bridge 1105 is further away than the house 1115. In one embodiment, the acoustic sensors 905 are sensitive enough to work up to a distance of about one meter, or the length of a typical arm. Typically, the source of inaccuracy in estimating the distance to the object is not due to sensor accuracy, but is due to user inaccuracy in being consistent in representing a certain object distances with a certain DHD 1025 and/or having a consistent finger snap volume or energy level. A user's accuracy of representing distance based on the DHD 1025 may be improved by a training routine where a user repeats a snap several times at a certain value of DHD 1025. In one embodiment, the acoustic sensors are precise enough to distinguish a small number of distances, such as three, where the device to hand distance (DHD) 1025, as shown in FIG. 10, can be determined to be within three ranges, short, medium and far, for example. The short DHD 41025 may relate to a first range of absolute distances to object (estimated) (ADO-E) 1030, the medium DHD 1025 may related to a second range of ADO-E 1030, and the far DHD 1025 may related to a third range of ADO-E 1030. The first range of ADO-E 1030 may be in range from about 10 meters to about 50 meters, the second range may be from about 50 to about 200 meters and the third range may be greater than about 200 meters. Other ranges of ADO-E 1030 may also be used. The user may be instructed to perform a training procedure to calibrate the device 1000 to detect the sound level of the user's finger snap at the DHD 1025 distances in representing the ADO-E 1030 distances. The number of detectable DHD 1025 distances and corresponding ADO-E 1030 distances may be 2, 3, 4, 5 or more. The ranges of the detectable DHD 1025 distances may be from about zero inches (adjacent to the device) to about 1 meter.

The DHD 1025 may be estimated by measuring the sound pressure levels in the acoustic signals of the snapping sound picked up by the acoustic sensors 905. In one embodiment, a fourth acoustic sensor may be added to directly locate the DHD 1025 (as well as RPD 1005) using time-of-arrival measurements of the snapping sound and the known relative locations of the four acoustic sensors. In this embodiment, the location of the snapping sound can be calculated in Cartesian space (x, y, z), relative to the known location of the acoustic sensors.

By combining the ADO-E 1030, the APD (absolute pointing direction) 1015 and the ADP (absolute device position) 1020, the location analysis subsystem of the device 1000 can determine an absolute object position (estimated) (AOP-E) 1035.

Figure 12:
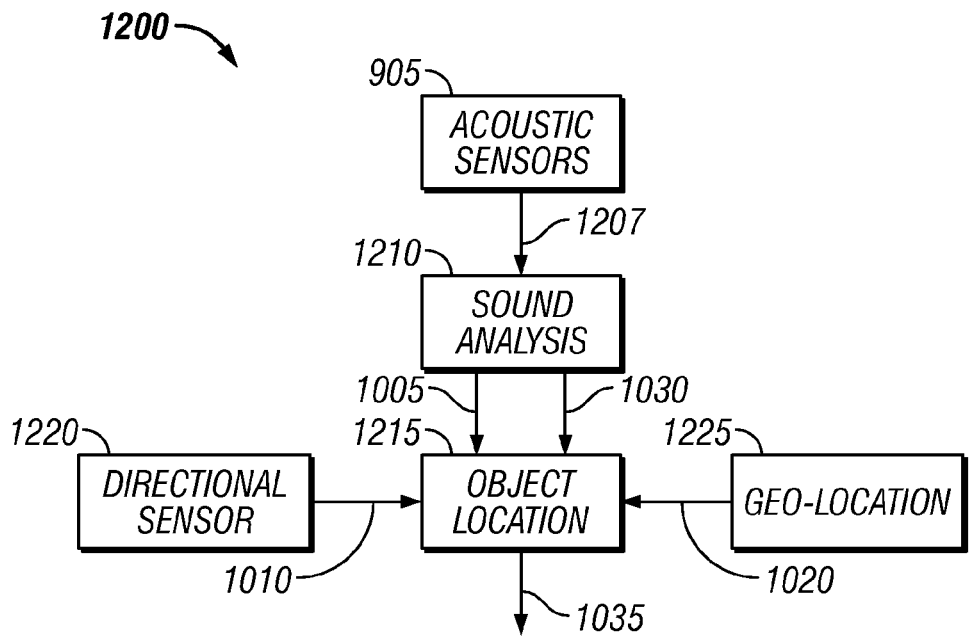
FIG. 12 is a block diagram illustrating an example of object selection in a system such as illustrated in FIGS. 9A, 9B and 9C.

FIG. 12 is a block diagram illustrating an example of object selection in a system such as illustrated in FIGS. 9A, 9B and 9C. The process 1200 starts with the acoustic sensors 905 collecting data related to a snapping sound. The snapping sound may be caused by a user snapping their fingers or by the user using a mechanical or electrical device configured to create the snapping sound (or any other well defined sound). The acoustic data 1207 collected by the acoustic sensors 905 is sent to a sound analysis subsystem 1210. There may be 2, 3, 4 or more acoustic sensors.

The sound analysis subsystem analyzes the acoustic data 1207 to detect the snapping sounds and then to analyze the detected snapping sounds. The acoustic data from each of the acoustic sensors is analyzed to detect the snapping sound. The sound analysis subsystem analyzes the detected snapping sounds in order to determine the direction of the snapping sound, the RPD 1005 in FIG. 10 discussed above, and also to estimate the distance to an object being selected by the user, the ADO-E 1030 in FIG. 10 discussed above. The sound analysis subsystem 1210 outputs the RPD 1005 and the ADO-E 1030, which are input to an object location subsystem 1215. Further details of the snap detection, direction determination and distance estimation functions performed by the sound analysis subsystem are discussed below in reference to FIG. 13.

The object location subsystem 1215 determines the location of the object relative to the user based on the RPD 1005 and the ADO-E 1030. In some embodiments, the relative location may be useful by itself in order to identify and select the object. For example, if a database is available containing objects indexed by their relative location to the user, or objects indexed by a known location within a locality where the location of the user is also known or available to the database, then this database could be queried with the relative location of the object and identify the object being selected. This may be useful for selecting an electronic device (e.g., a television, stereo, DVD player, etc.) to be controlled with hand gestures, where the electronic device has a known location in a house, for example.

The object location subsystem 1215 may also receive input from a directional sensor subsystem 1220 and a geo-location subsystem 1225. The directional subsystem 1220 may comprise a compass and an inclinometer to determine the absolute device orientation vector, the ADH 1010 illustrated in FIG. 10 that is input to the object location subsystem 1215. The geo-location subsystem may comprise a GPS or cellular network location system or other location sensing systems (based on WiFi signals (IEEE802.11), visual odometry, radio and TV broadcast signals, etc) that provides the absolute device position, the ADP 1020 illustrated in FIG. 10, that is also input to the object location subsystem 1215. Using the inputs 1005, 1010, 1020 and 1030, the object location subsystem 1215 determines the geo-location of the object, referred to as the AOP-E 1035 in FIG. 10. The AOP-E 1035 may then be output by the process 1200 to be used, for example, as an input to a physical browsing system as discussed above.

Figure 13:
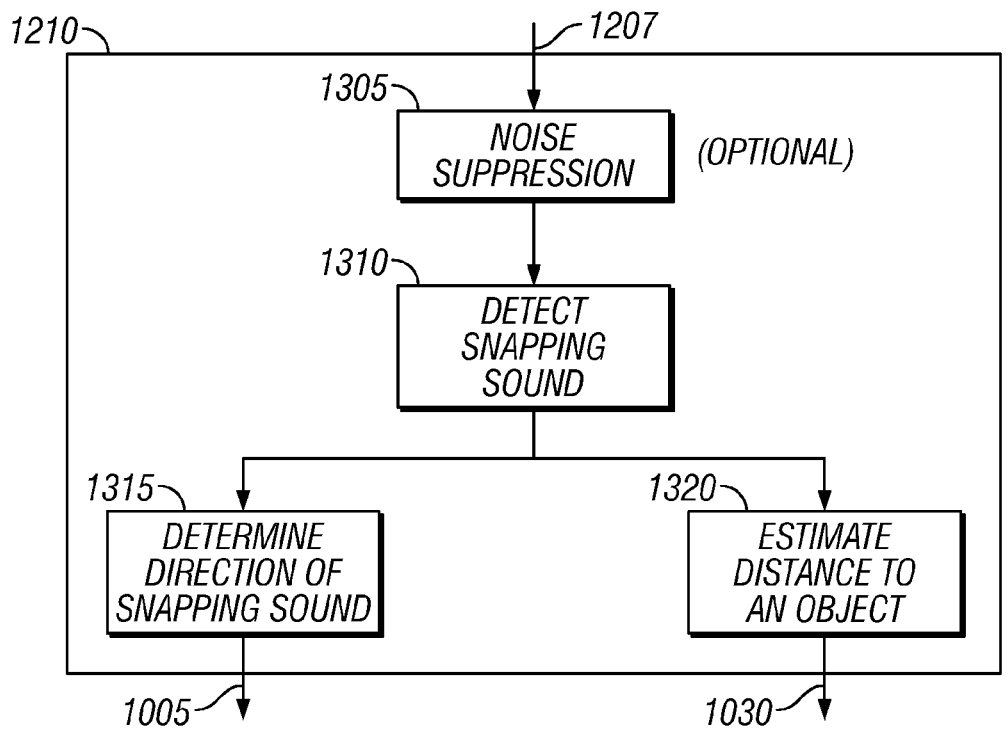
FIG. 13 is a block diagram illustrating certain details of sound analysis used in object selection such as illustrated in FIG. 12.

FIG. 13 is a block diagram illustrating certain details of sound analysis used in object selection such as illustrated in FIG. 12. As discussed above, the sound analysis subsystem 1210 receives the acoustic data 1207 collected by the acoustic sensors 905. The sound analysis subsystem 1210 may include an optional noise suppression subsystem 1305 that performs preprocessing of the acoustic data 1207 prior to detection of the snapping sound. Noise suppression is also commonly referred to as noise cancellation and noise reduction. Noise suppression may be adapted to cancel or suppress background noise that may interfere with the detection of the snapping sound. Noise suppression techniques take advantage of a priori knowledge of the characteristics of the expected snapping sound in order to remove noise from the acoustic data 1207 that is not similar in nature to the snapping sound. Noise may include random noise, e.g., white noise, or non-random noise created by people and or equipment in the vicinity of the acoustic sensors. The noise suppression may be performed in the time domain or other domains such as the frequency domain or amplitude.

After the optional noise suppression 1305 is performed, the process 1200 continues at block 1310 where the sound analysis subsystem 1210 detects the snapping sound in the acoustic data 1207 received from the acoustic sensors 905. The snap detection may include various forms of filtering including, for example, the use of a matched filter to correlate the expected pattern of a finger snap with the acoustic data 1207. Other technologies such as pattern recognition may also be performed at block 1310 to detect the presence of a snapping sound. Filtering and/or pattern recognition may be performed in the time domain or other domains such as the frequency domain or the amplitude domain (e.g., n times noise floor).

When a snapping sound is detected in the acoustic data 1207 at the block 1310, the time of the snapping event is determined for each of the signals from the multiple acoustic sensors and the arrival time delay between each sensor is computed. This time delay data is used to determine the direction of the snapping sound or RPD 1005 at block 1315 as discussed above in reference to FIG. 10. The RPD 1005 is then output to the object location subsystem 1215 as shown in FIG. 12.

The sound analysis subsystem 1210 is also used to determine the signal strength (e.g., sound pressure level SPL) of each of the detected snapping events. These signal strengths are then used to estimate the distance to the object at block 1320 as discussed above in reference to FIGS. 10 and 11. The ADO-E 1030 is then output to the object location subsystem 1215 as shown in FIG. 12. Using the RPD 1005, the ADO-E 1030 along with the inputs 1010 and 1020, the object location subsystem 1215 determines the geo-location of the object, referred to as the AOP-E 1035 shown in FIG. 10.

An embodiment is a system for selecting an object from a plurality of objects in a physical environment. The system of this embodiment includes means for framing an object located in a physical environment by positioning an aperture at a selected distance from a user's eye, the position of the aperture being selected such that the aperture substantially encompasses the object as viewed from the user's perspective. The system further includes means for detecting the aperture by analyzing image data including the aperture and the physical environment, and means for selecting the object substantially encompassed by the detected aperture. With reference to FIGS. 2 and 7, aspects of this embodiment include where the means for framing is the finger aperture 225, where the means for detecting the aperture is the image analysis subsystem 710, and where the means for selecting the object is the object location subsystem 715.

Another embodiment is a system for selecting an object from a plurality of objects in a physical environment. The system of this embodiment includes means for analyzing acoustic data received by a plurality of acoustic sensors, means for detecting a snapping sound in the acoustic data, means for determining the direction of the snapping sound, means for estimating the distance to an object based on loudness measurements of the snapping sound detected in the acoustic data, and means for determining the location of the object relative to the system based at least in part on the determined direction, the estimated distance to the object and a location of the system. With Reference to FIG. 12, aspects of this embodiment include where the analyzing means is the sound analysis subsystem 1210, where the detecting means is the sound analysis subsystem 1210, where the direction determining means is the sound analysis subsystem 1210, where the distance estimating means is the sound analysis subsystem 1210, and where the means for determining the location of the object is the object location subsystem 1215.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A system for selecting an object from a plurality of objects in a physical environment, the system comprising:
 a plurality of acoustic sensors;
 a sound analysis subsystem configured to analyze acoustic data received by the plurality of acoustic sensors, the sound analysis subsystem further configured to detect a snapping sound caused by a source controlled by a user of the system, determine the relative direction of the source of the snapping sound, and estimate the distance to the source of the snapping sound based on loudness measurements of the snapping sound detected in the acoustic data;
 an object distance estimation subsystem configured to estimate a distance to an object other than the source of the snapping sound based at least in part on the determined estimated distance to the source; and
 an object location subsystem configured to determine the location of the object relative to the system based at least in part on the determined relative direction, the estimated distance to the object and a location of the system.

2. The system of claim 1, wherein the sound analysis subsystem is further configured to determine the direction of the snapping sound based on times of arrival of the detected snapping sound in the acoustic data.

3. The system of claim 1, further comprising a geo-location subsystem configured to sense a geo-location of the system, wherein the object location subsystem is further configured to determine a geo-location of the object based on the determined relative location of the object and the sensed geo-location of the system.

4. The system of claim 3, wherein the geo-location subsystem comprises a GPS sensor.

5. The system of claim 3, further comprising a geo-tagged object database configured to identify the object based on the determined geo-location of the object.

6. The system of claim 1, wherein the sound analysis subsystem is further configured to determine the direction of the snapping sound in a local coordinate system, the system further comprising:
 a directional subsystem configured to sense an orientation of the acoustic sensors in a geo-location coordinate system, wherein the object location subsystem is further configured to determine a relationship between the geo-location coordinate system and the local coordinate system, and determine the direction of the snapping sound in the geo-location coordinate system based on the determined relationship and the determined direction of the object in the local coordinate system.

7. The system of claim 1, wherein the sound analysis subsystem is further configured to estimate the distance to the object to be within a plurality of distance ranges.

8. The system of claim 1, further comprising a noise suppression subsystem configured to suppress noise in the acoustic data used to detect the snapping sound.

9. The system of claim 1, wherein the acoustic sensors are attached to the user.

10. A method of selecting an object from a plurality of objects in a physical environment, the method comprising:
 analyzing acoustic data received by a plurality of acoustic sensors;
 detecting a snapping sound in the acoustic data, wherein the snapping sound is caused by a source controlled by a user of the system;
 determining the direction of the snapping sound;
 estimating the distance to an object other than the source of the snapping sound based on loudness measurements of the snapping sound detected in the acoustic data; and
 determining the location of the object relative to the system based at least in part on the determined direction, the estimated distance to the object and a location of the system.

11. The method of claim 10, wherein determining the direction of the snapping sound comprises determining the direction of the snapping sound based on times of arrival of the detected snapping sound in the acoustic data.

12. The method of claim 10, further comprising:
 sensing a geo-location of the system; and determining a geo-location of the object based on the determined relative location of the object and the sensed geo-location of the system.

13. The method of claim 12, wherein sensing the geo-location of the system comprises sensing the geo-location of the system using a GPS sensor.

14. The method of claim 12, further comprising identifying the object based on the determined geo-location of the object.

15. The method of claim 10, wherein determining the direction of the snapping sound comprises determining the direction of the snapping sound in a local coordinate system, the method further comprising:
   determining a relationship between a geo-location coordinate system and the local coordinate system; and
   determining the direction of the snapping sound in the geo-location coordinate system based on the determined relationship and the determined direction of the object in the local coordinate system.

16. The method of claim 10, wherein estimating the distance to the object further comprises estimating the distance to the object to be within a plurality of distance ranges.

17. The method of claim 10, further comprising suppressing noise in the acoustic data used to detect the snapping sound.

18. A system for selecting an object from a plurality of objects in a physical environment, the system comprising:
   means for analyzing acoustic data received by a plurality of acoustic sensors;
   means for detecting a snapping sound in the acoustic data;
   means for causing the snapping sound, wherein the means for causing the snapping sound is controlled by a user;
   means for determining the direction of the snapping sound;
   means for estimating the distance to an object other than the means for causing the snapping sound based on loudness measurements of the snapping sound detected in the acoustic data; and
   means for determining the location of the object relative to the system based at least in part on the determined direction, the estimated distance to the object and a location of the system.

19. The system of claim 1, wherein the source of the snapping sound is the user's fingers.

20. The system of claim 1, wherein the source of the snapping sound is a device controlled by the user.

21. The method of claim 10, wherein the snapping sound is caused by manipulation of the user's fingers.

* * * * *